Jan. 11, 1944.   G. W. GUNNER ET AL   2,338,845
HYDRAULIC PISTON SNUBBER
Filed Oct. 10, 1941
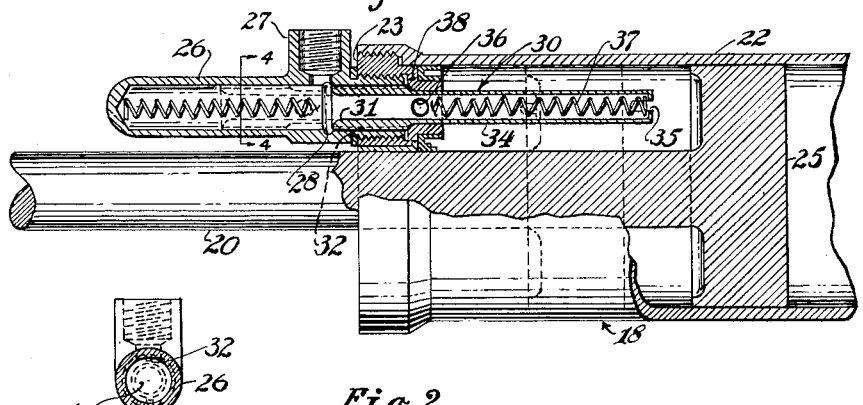
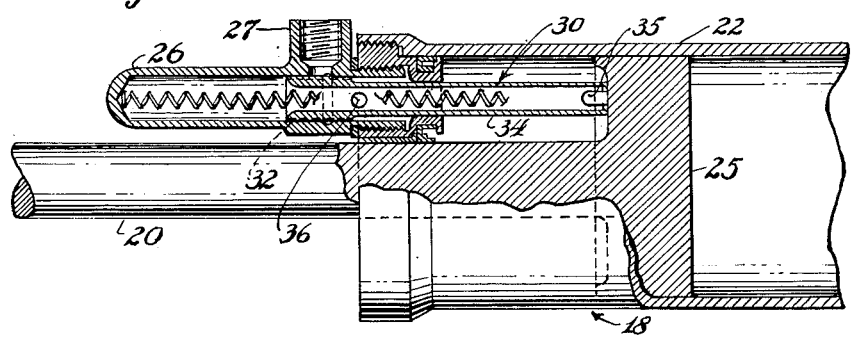
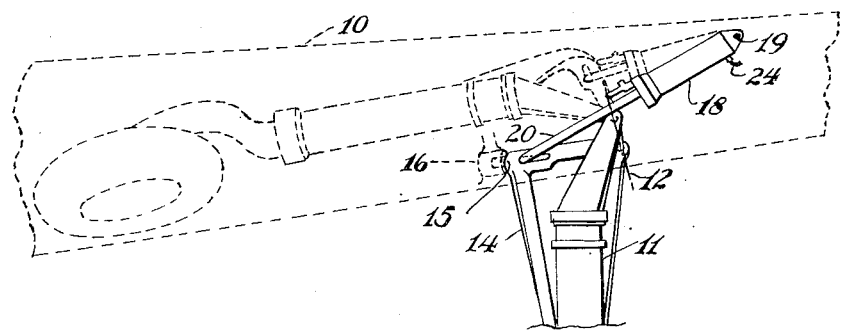
INVENTOR
GEORGE W. GUNNER
BY CLEMENT J. TURANSKY
ATTORNEY Patented Jan. 11, 1944

2,338,845

UNITED STATES PATENT OFFICE 2,338,845

HYDRAULIC PISTON SNUBBER

George W. Gunner, Snyder, and Clement J. Turansky, Kenmore, N. Y., assignors to Curtiss-Wright Corporation, a corporation of Delaware Application October 10, 1941, Serial No. 414,436

6 Claims. (Cl. 121—38)

This invention relates to hydraulic motors and is particularly concerned with improvements in snubbers for piston-cylinder motors by which movement of the piston within the cylinder is cushioned as the piston approaches the end of its stroke.

The invention is particularly adapted for use in connection with aircraft retractable landing gears. In such landing gears, hydraulic motors are frequently used to effect landing gear retraction and extension, the landing gear being drawn upwardly into retracted position in an aircraft by imposing pressure fluid on one end of a piston-cylinder motor and the landing gear being extended downwardly by the imposition of pressure fluid on the other end of the piston-cylinder motor. When the landing gear is extended, gravity of course assists such extension but gravity alone may not ordinarily be depended upon since landing gear extension may not be fast enough under gravity influence. Extension must of course be made positive and definite and it is for this reason that power is applied for landing gear extension to augment the force of gravity. Landing gear extension may at times be excessively rapid so that the speed of movement of the landing gear as it approaches its fully extended position may be so great as to cause slamming of the assembly into extended position whereupon excessive shock loads are imposed on the structure, sometimes causing breakage of fittings or other parts in the landing gear assembly.

It is an object of this invention to provide a snubber by which the velocity of the landing gear during its extensive movement is reduced as the landing gear approaches its fully extended position. It is a further object to provide a snubber which shall be operative only during a small part of the path of travel of the landing gear and it is a further object to provide partial restriction in landing gear extension so that final landing gear extensive movement will be accomplished without restraint to enable proper locking of the landing gear in its extended position by a separate locking means provided for this purpose.

Further objects of the invention will become apparent in reading the annexed specification in connection with the drawing, in which:

Fig. 1 is a fragmentary longitudinal section of a hydraulic motor showing the snubber in its inactive position;

Fig. 2 is a view similar to Fig. 1 showing the snubber in operation;

Fig. 3 is a diagrammatic view of an aircraft retractable landing gear showing the environment in which the snubber is used; and Fig. 4 is a section on the line 4—4 of Fig. 1.

Referring first to Fig. 3, we show an aircraft wing 10 to which a landing gear strut 11 is hinged on an axis 12 for movement between its retracted position (shown in dotted lines) and its extended position (shown in full lines). The landing gear is provided with a triangulated structure 14 having a locking lug 15 engageable in a socket 16 in the wing to secure the gear firmly in its extended position. Extension and retraction of the landing gear is afforded by a piston-cylinder motor 18 pivoted at 19 to the aircraft, the piston rod 20 of the motor being linked to the bolt 15 whose movement is limited in the structure 14. When the motor 18 is retracted, by hydraulic pressure means and suitable valves, not shown, the bolt 15 is withdrawn from its socket 16 and the landing gear is swung upwardly and to the left as shown in Fig. 3 about its axis 12 to the retracted position. When extension of the landing gear is to be effected, fluid pressure is admitted to the righthand end of the motor 18 and the lefthand end of the motor is opened to a drainage pipe connecting with a fluid reservoir whereupon the landing gear is moved downwardly about its axis to the extended position. Such downward movement is augmented by the force of gravity so that the landing gear may move very quickly to the extended position with a sufficient force to fracture portions of the structure. It is to effect a partial snubbing of the extensive movement of the landing gear that the snubber shown in Figs. 1 and 2 is provided.

Referring to these figures, the motor 18 comprises a cylinder 22 having a head 23 through which the piston rod 20 is slidable, said rod having a piston 25 slidable within the cylinder. Pressure fluid may pass to and from the righthand end of the cylinder 22 through a conduit 24 shown in Fig. 3. The head 23 is provided with a thimble 26 having, intermediate its length, a fitting 27 for a fluid conduit through which fluid may pass to and from the lefthand end of the cylinder. The thimble 26 is bored cylindrically and is provided with an annular groove 28 in the plane of the fitting 27. Within the thimble 26 a plunger 30 is slidable, said plunger having a head portion 31 fitted to the thimble bore, said head portion having one or more small longitudinal grooves 32 along its surface. Extending to the right of the head portion 31 is a stem 34 projecting into the lefthand end of the cylinder. The plunger 30 is hollow to afford free communication from its righthand end, through slots 35, to its lefthand end and also to a port 36 in its wall, just to the right of the head portion 31. A spring 37 normally urges the plunger 30 toward the right, so that the end of the head 31 comes into contact at 38 with a portion of the cylinder head 23 to limit rightward movement of the plunger.

When the landing gear is to be extended, fluid pressure is admitted to the righthand end of the cylinder 22 through the conduit 24, and the fitting 27 is opened to a fluid reservoir. Thereupon, the piston 25 moves leftwardly in the cylinder without restraint until the piston 25 engages the righthand end of the plunger 30, causing leftward movement of the plunger with the piston. Then, the plunger head 31 covers the groove 28 and all fluid leaving the cylinder 22 must pass through the restricted grooves 32 in the plunger head before it may pass from the cylinder through the fitting 27. This restriction to outward flow snubs the movement of the piston and retards its speed to a sufficient degree to prevent slamming of the landing gear into its extended position. After the piston moves to the left under snubbed conditions to an extent governed by the length of the plunger head 31, free fluid flow from the cylinder is again permitted, such fluid passing through the hollow plunger, through the port 36 and into the fitting 27. Thus, the last short distance of landing gear extension is not snubbed, permitting positive landing gear movement under the influence of hydraulic pressure and without any material assistance from gravity, into its locking position whereat the bolt 15 engages the socket 16.

An essential provision of the invention is that the period of snubbing is restricted to a comparatively short portion of the piston stroke and that snubbing action ceases before the piston has reached the end of its stroke. In prior arrangements with which applicants are familiar, snubbing action has been introduced into hydraulic motor systems which act for a short stroke increment at the extreme end of the stroke whereby the final hydraulic force is applied through the snubber during the interval when the piston is at the end of its stroke.

The plunger 31 may be considered as a metering pin operable to meter fluid during a short period of its movement and to allow free flow during the balance of its movement. It should be further pointed out that the stroke of the plunger or metering pin 30 is only a small fraction of the total stroke of the piston 25 so that the assembly of motor 18 and snubber system need be of no greater length than the motor 18 would be without the snubber. Furthermore, the snubber system may be applied to existing forms of hydraulic motors and it is unnecessary to utilize a hollow piston rod to accommodate a metering pin. It should be pointed out that the hydraulic motor 18 does not comprise a shock absorber which device is incorporated in the landing gear strut 11—it serves merely as a motor for effecting landing gear extension and retraction. It is within the scope of the invention to provide variations in the snubbing effect of the plunger 31 as for instance by varying the effective area of the grooves 32 in accordance with the displacement of the plunger 30 with respect to the thimble 26.

When the landing gear is retracted, the plunger 30 will move rightwardly with the piston 25 until the plunger is stopped by the cylinder head after which the piston 25 moves freely toward the righthand end of its cylinder. During landing gear retraction, the plunger head 31 must again pass the fluid fitting 27 and a short period of restriction of fluid flow will occur during such passage. However, the time element is sufficient during landing gear retraction so that this slight delay is immaterial.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. A snubber assembly for a piston-cylinder motor comprising a thimble secured to one end of the cylinder and disposed axially parallel thereto, said thimble being open at one end to said cylinder and having a port intermediate its length, a hollow plunger slidable within the thimble and having a head portion fitted to the thimble wall so as to provide a restricted fluid path therebetween, said hollow plunger having a hollow stem portion extending into said cylinder and an intermediate port in said stem portion, the end of said hollow stem being open and contactable by said piston as said piston approaches the end of its stroke, said thimble port being covered by the head portion of said plunger upon movement of said plunger by said piston to provide a relatively restricted flow path from the cylinder and hollow plunger through the thimble port via the restricted fluid path between the plunger head portion and the thimble, said piston moving the plunger head portion beyond said thimble port just prior to the end of its stroke to establish relatively unrestricted fluid flow from said cylinder through said thimble port via said intermediate port.

2. In a piston-cylinder fluid motor, a port in said motor cylinder, a hollow element slidably movable relative to said port, said hollow element being biased toward said piston and engageable thereby as said piston approaches the end of its stroke and said element permitting relatively unrestricted fluid flow from said cylinder through said port prior to said engagement by said piston and after engagement by said piston said element providing a restricted fluid flow path from said cylinder through said port, and movement of said element by said piston just prior to the completion of the piston stroke opening a relatively unrestricted fluid flow path from the motor cylinder through said port.

3. In a piston-cylinder fluid motor, an auxiliary cylinder secured to one end of and opening into said motor cylinder, a port in said auxiliary cylinder, a hollow plunger slidable in said cylinder and cooperating with said port to normally provide a relatively unrestricted fluid flow path through said plunger hollow and port, said plunger being adapted to be moved by said motor piston as the piston approaches the end of its stroke to provide a restricted fluid flow path from the motor cylinder through said port, and a port in the hollow plunger adapted to establish a relatively unrestricted fluid flow path from the motor cylinder through said ports just prior to the completion of the piston stroke.

4. In a piston-cylinder fluid motor, an auxiliary cylinder secured to one end of and opening into said motor cylinder, said auxiliary cylinder having a port therein, a hollow plunger slidable in said cylinder and cooperating with said port to normally provide a relatively unrestricted fluid flow path through said plunger hollow and port, said plunger having an enlarged head portion fitted to the auxiliary cylinder wall and providing a restricted flow path therebetween, said plunger being adapted to be moved by said motor piston as the piston approaches the end of its stroke to provide a restricted fluid flow path from the motor cylinder through said port, and a port in the hollow plunger adapted to establish a relatively unrestricted fluid flow path from the motor cylinder through said ports just prior to the completion of the piston stroke.

5. In a piston-cylinder fluid motor, an auxiliary cylinder secured to one end of and opening into said motor cylinder, a port intermediate the length of said auxiliary cylinder, a hollow plunger slidable in said auxiliary cylinder and extending toward the motor piston for engagement therewith as the piston approaches the end of its stroke, an enlarged head on said plunger adjacent the end thereof remote from the motor piston and fitted to the auxiliary cylinder wall to provide a restricted flow path therebetween, said plunger normally being positioned toward the motor piston with its enlarged head positioned beyond the auxiliary cylinder port, and a port in said plunger between its enlarged head and the piston engaging end of the plunger.

6. In a piston-cylinder fluid motor, an auxiliary cylinder secured to one end of and opening into said motor cylinder, a port in said auxiliary cylinder, a hollow plunger slidable in said cylinder and cooperating with said port to normally provide a relatively unrestricted fluid flow path from said cylinder through said hollow plunger and port, said plunger having an enlarged head portion fitted to said auxiliary cylinder wall to provide a restricted passageway therebetween, said plunger being adapted to be moved by said piston as the piston approaches the end of its stroke to interpose said restricted passageway in the fluid flow path from said cylinder through said port, and a relatively unrestricted fluid passageway opened by movement of said plunger just prior to the completion of the piston stroke to effect a by-pass of said restricted passageway.

GEORGE W. GUNNER.
CLEMENT J. TURANSKY.